US009062585B2

(12) United States Patent
Kim et al.

(10) Patent No.: US 9,062,585 B2
(45) Date of Patent: Jun. 23, 2015

(54) LARGE-CAPACITY METAL CATALYST CARRIER AND CATALYTIC CONVERTER USING SAME

(75) Inventors: Myoung Soo Kim, Seoul (KR); Sun Hwan Ko, Gimpo-si (KR); Tae Hyun Hur, Gimpo-si (KR); Tong Bok Kim, Gimpo-si (KR); Sung Chul Yang, Seoul (KR)

(73) Assignee: AMOGREENTECH CO., LTD. (KR)

( * ) Notice: Subject to any disclaimer, the term of this patent is extended or adjusted under 35 U.S.C. 154(b) by 263 days.

(21) Appl. No.: 13/639,583

(22) PCT Filed: Apr. 5, 2011

(86) PCT No.: PCT/KR2011/002346
§ 371 (c)(1),
(2), (4) Date: Oct. 5, 2012

(87) PCT Pub. No.: WO2011/126256
PCT Pub. Date: Oct. 13, 2011

(65) Prior Publication Data

US 2013/0028808 A1 Jan. 31, 2013

(30) Foreign Application Priority Data

Apr. 5, 2010 (KR) ........................ 10-2010-0030959

(51) Int. Cl.
*B01D 50/00* (2006.01)
*F01N 3/28* (2006.01)
(Continued)

(52) U.S. Cl.
CPC ....... *F01N 3/2814* (2013.01); *Y10T 428/24157* (2015.01); *B01D 53/94* (2013.01);
(Continued)

(58) Field of Classification Search
CPC ........ B01D 53/94; B01J 23/72; B01J 23/755; F01N 3/34; F01N 3/281; F01N 2450/30; F01N 2330/20
USPC ......................................... 422/171, 177, 180
See application file for complete search history.

(56) References Cited

U.S. PATENT DOCUMENTS

| | | | | |
|---|---|---|---|---|
| 2,718,460 | A * | 9/1955 | Bowen, III | 422/179 |
| 4,849,185 | A * | 7/1989 | Wittig | 422/171 |
| 7,037,567 | B2 | 5/2006 | Hashimoto et al. | |

FOREIGN PATENT DOCUMENTS

| | | |
|---|---|---|
| JP | 61135539 | 6/1986 |
| JP | 2002239345 | 8/2002 |

(Continued)

OTHER PUBLICATIONS

International Search Report—PCT/KR2011/002346 dated Dec. 9, 2011.

*Primary Examiner* — Tom P Duong
(74) *Attorney, Agent, or Firm* — Cantor Colburn LLP

(57) ABSTRACT

Provided is a large-capacity metal catalyst support and a catalytic converter using the same, in which a number of unit catalyst support blocks are changed in a form of being effectively assembled so as to be applied to a catalytic converter that is required for processing a large amount of exhaust gas such as large vessels or plants employing a number of large-scale internal combustion engines, or large food processing devices, to thus easily assemble the unit catalyst support blocks into a large-scale assembled structure. The catalyst support includes: a number of unit catalyst support blocks in which cell formation bodies formed of a number of hollow cells that are aligned in a longitudinal direction are accommodated and stacked in a polygonal supporter wherein a catalyst is coated on the surfaces of the hollow cells; and a number of assembly members each for fixing a pair of adjacent supports that mutually contact between the stacked unit catalyst support blocks.

13 Claims, 13 Drawing Sheets

B1 A B2 100 111 112 113 116 117 115 114 B4 B3

(51) Int. Cl.

| | |
|---|---|
| ***B01D 53/94*** | (2006.01) |
| ***B01J 23/34*** | (2006.01) |
| ***B01J 23/42*** | (2006.01) |
| ***B01J 23/44*** | (2006.01) |
| ***B01J 23/50*** | (2006.01) |
| ***B01J 23/72*** | (2006.01) |
| ***B01J 23/75*** | (2006.01) |
| ***B01J 23/755*** | (2006.01) |
| ***B01J 37/02*** | (2006.01) |
| *B01J 35/04* | (2006.01) |

(52) U.S. Cl.

CPC ................ *B01J 23/34* (2013.01); *B01J 23/42* (2013.01); *B01J 23/44* (2013.01); *B01J 23/50* (2013.01); *B01J 23/72* (2013.01); *B01J 23/75* (2013.01); *B01J 23/755* (2013.01); *B01J 35/04* (2013.01); *B01J 37/0225* (2013.01); *F01N 3/281* (2013.01); *F01N 3/2842* (2013.01); *F01N 3/2875* (2013.01); *F01N 2330/02* (2013.01); *F01N 2450/24* (2013.01); *F01N 2450/30* (2013.01); *F01N 2510/08* (2013.01); *F01N 2530/02* (2013.01); *F01N 2590/02* (2013.01)

(56) References Cited

FOREIGN PATENT DOCUMENTS

| | | |
|---|---|---|
| JP | 2007203256 | 8/2007 |
| KR | 1020040074209 | 8/2004 |

* cited by examiner

LARGE-CAPACITY METAL CATALYST CARRIER AND CATALYTIC CONVERTER USING SAME

TECHNICAL FIELD

This invention relates to a large-capacity metal catalyst support and a catalytic converter using the same. More particularly, this invention relates to a large-capacity metal catalyst support and a catalytic converter using the same, in which a number of unit catalyst support blocks are changed in a form of being effectively assembled so as to be applied to a catalytic converter that is required for processing a large amount of exhaust gas such as large vessels or plants employing a number of large-scale internal combustion engines, or large food processing devices, to thus easily assemble the unit catalyst support blocks into a large-scale assembled structure.

BACKGROUND ART

In general, automobile cars and vessels generate power necessary to be driven by using a fossil fuel such as gasoline or diesel oils, but generate exhaust gas such as carbon monoxides and nitrogen oxides that are harmful to the human body, according to an incomplete combustion of the fuels in view of the structural nature. Accordingly, the automobile cars and vessels include a variety of devices in the respective components of the automobile cars and vessels that generate hazard exhaust gas due to incomplete combustion of the fuel, such as a combustion chamber that performs combustion of fuels such as gasoline and diesel oils, an air intake system that performs a mixture of air and fuel, and an exhaust gas system that discharges exhaust gas, to thereby suppress an amount of exhaust gas at maximum.

Thus, a catalytic converter is attached and used in between an exhaust pipe through which exhaust gas is discharged to the outside, in order to remove harmful ingredients from the exhaust gas. The catalytic converter uses an oxidation catalyst that oxides carbon monoxide (CO) and hydrocarbons (HC) from exhaust gas to be converted into carbon dioxide ($CO_2$) and water ($H_2O$), and a reduction catalyst that reduces nitrogen compounds (NOx) into nitrogen ($N_2$). In addition, in order to meet requirements such as temperature required for reaction and residence time of exhaust gas, an effective area of the catalytic converter becomes large, and furthermore a catalyst support on the surface of which particle-shaped catalysts are attached is mounted in a housing.

Meanwhile, the catalyst support has a honeycomb structure consisting of rectangular or hexagonal cells, on which a catalyst is coated to cause an oxidation and reduction reaction of harmful components from among exhaust gas.

Therefore, the exhaust gas entering the inside of the housing via the exhaust pipe performs a catalytic reaction with the catalyst coated on the catalyst support and then is discharged to an exit unit.

An example of a catalyst support of a honeycomb structure is disclosed in Korean Patent Registration No. 527970, and will be described with reference to FIGS. 1 and 2.

Catalyst supports 1*a* and 1*b* are formed of cells 4*a* and 4*b* respectively having a rectangular cell structure shown in FIG. 1 and a hexagonal cell structure shown in FIG. 2. Each cell 4*a* or 4*b* forms a penetration hole 3*a* or 3*b*, respectively. A catalyst coating layer such as alumina (for example, $Al_2O_3$, etc.) including precious metals is coated between the cell 4*a* and a cell passage barrier 2*a* and between the cell 4*b* and a cell passage barrier 2*b*. The catalyst supports 1*a* and 1*b* perform an oxidation and reduction reaction of exhaust gas by the catalyst coated on the catalyst coating layer, respectively, to thus exert a function of removing harmful components from among exhaust gas.

A catalytic support for automobile cars is formed of a ceramic integrated cell structure having a circular cell structure, to thus obtain a uniform distribution of a coating layer and a small vertical height between cell lines, and to thereby increase a cell density. By doing so, a sufficient contact reaction condition between the catalyst support and the exhaust gas is guaranteed, to thus improve an entire exhaust gas purification efficiency of the catalytic converter.

However, since the catalytic support for automobile cars is manufactured by an extrusion process that feeds a ceramic raw material to an extruder and pushing out the extruded ceramic raw material from a mold, so as to be converted into a continuum formed of a honeycomb shaped cross-section, it is difficult to apply the catalytic support to places where a large capacity catalytic reactor is needed for large vessels or plants using a number of large engines.

In addition, a diesel exhaust gas pollution reduction device that is obtained by extrusion molding a high hardness material such as a diesel particulate filter (DPF) for use in diesel engines, for example, silicon carbide (SiC) is expensive, suffers from a short-lived extrusion mold, and causes a number of molds to be retained depending on types of mass produced products.

Moreover, the catalyst support disclosed in the Korean Patent Registration No. 527,970 has a cylindrical external support regardless of the cell structure. Thus, a number of the catalyst supports may not be easily cross-assembled for the purpose of integrating them into a large-capacity assembly structure.

According to the conventional art described above, attempts were made by stacking a number of cylindrical unit catalyst support blocks formed of a ceramic structure in order to manufacture a large-capacity catalyst support, but as described above, it was difficult to manufacture a large-capacity catalyst support.

Meanwhile, in the case that catalyst supports are made of metal, it is easy to manufacture catalyst supports of 30 cm or less in diameter but is difficult to manufacture catalyst supports of more than 30 cm in diameter.

In particular, the International Maritime Organization (IMO) adopted the International Convention on the Prevention of Marine Pollution from Ships (MARPOL), in 1973. Here, a marine engine exhaust nitrogen oxide regulation program mentions that exhausts nitrogen oxides (Nox) decrease by 20% compared to a 1973-based current amount in Tier II starting from 2011, and decrease by 80% in Tier III starting from 2016. For reference, the International Maritime Organization (IMO) is one of the specialized agencies of the United Nations in order to internationally unify the ship's routes, traffic rules, port facilities, and so on. As a result, the large vessel industry using large engines has been conducting active researches on a large-capacity catalytic converter for purifying nitrogen oxides contained in the exhaust gas.

Therefore, the catalytic converter is required to have a structure of being manufactured and provided from a small-capacity structure from a large-capacity structure so as to process a large amount of exhaust gas in large vessels or plants employing a number of large-scale internal combustion engines, or large food processing devices.

DISCLOSURE

Technical Problem

To solve the above problems, it is an object of the present invention to provide a large-capacity metal catalyst support and a catalytic converter using the same, in which a number of unit catalyst support blocks are changed in a form of being effectively assembled so as to be applied to a catalytic converter that is required for processing a large amount of exhaust gas such as large vessels or plants employing a number of large-scale internal combustion engines, or large food processing devices, to thus easily assemble the unit catalyst support blocks into a large-scale assembled structure.

It is another object of the present invention to provide a large-capacity metal catalyst support and a catalytic converter using the same, in which unit catalyst support blocks that are manufactured by using metallic thin plates to thus be easily manufactured, are assembled to thereby simplify a manufacturing process and save a manufacturing cost.

Technical Solution

To accomplish the above object of the present invention, according to an aspect of the present invention, there is provided a large-capacity catalyst support comprising:

a number of unit catalyst support blocks in which cell formation bodies formed of a number of hollow cells that are aligned in a longitudinal direction are accommodated and stacked in a polygonal supporter wherein a catalyst is coated on the surfaces of the hollow cells; and a number of assembly members each for fixing a pair of adjacent supports that mutually contact between the stacked unit catalyst support blocks.

Preferably but not necessarily, each assembly member comprises:

an upper body piece that is made in a T-shaped form and at both sides of one of which a pair of first support accommodation projections are extensively formed so as to form a pair of first support accommodation grooves;

a lower body piece that is made in a T-shaped form and at both sides of one end of which a pair of second support accommodation projections are extensively formed so as to form a pair of second support accommodation grooves; and a fixing unit for fixing the upper and lower body pieces.

Preferably but not necessarily, each assembly member comprises:

an upper body piece at both sides of one end of which a pair of first support accommodation projections are respectively extensively formed so as to form a first support accommodation groove in which one side of the one support is accommodated;

a lower body piece at both sides of one end of which a pair of second support accommodation projections are respectively extensively formed so as to form a second support accommodation groove in which one side of the other support is accommodated; and a number of pushing pins that are coupled with a number of pushing pin accommodation grooves that are formed along a width direction of each body piece so as to fix the supports.

Preferably but not necessarily, each assembly member comprises:

an upper body piece at both sides of one end of which a pair of first support accommodation projections whose inner surfaces are lanced and that are placed obliquely toward a first support accommodation groove, are respectively extensively formed so as to form the first support accommodation groove in which one side of the one support is accommodated; and a lower body piece at both sides of one end of which a pair of second support accommodation projections whose inner surfaces are lanced and that are placed obliquely toward a second support accommodation groove, are respectively extensively formed so as to form the second support accommodation groove in which one side of the other support is accommodated.

Preferably but not necessarily, each assembly member comprises:

an upper body piece at both sides of one end of which a pair of first support accommodation projections are respectively extensively formed so as to form a first support accommodation groove in which one side of the one support is accommodated, wherein the upper body piece has a number of pairs of first support fixing projections that are protrudingly formed on the inner surfaces of the first support accommodation projections and that are compressively coupled with the one support; and a lower body piece at both sides of one end of which a pair of second support accommodation projections are respectively extensively formed so as to form a second support accommodation groove in which one side of the other support is accommodated, wherein the lower body piece has a number of pairs of second support fixing projections that are protrudingly formed on the inner surfaces of the second support accommodation projections and that are compressively coupled with the other support.

Preferably but not necessarily, each assembly member comprises:

an upper body piece at both sides of one end of which a pair of first support accommodation projections are respectively extensively formed wherein a first intermediate support accommodation projection is extensively formed between the first support accommodation projections so as to form first and second support accommodation grooves in which the supports are respectively accommodated, wherein the upper body piece has first compressing grooves that are concavely formed on the outer surfaces of the first support accommodation projections; and a lower body piece at both sides of one end of which a pair of second support accommodation projections are respectively extensively formed wherein a second intermediate support accommodation projection is extensively formed between the second support accommodation projections so as to form third and fourth support accommodation grooves in which the supports are respectively accommodated, wherein the lower body piece has second compressing grooves that are concavely formed on the outer surfaces of the second support accommodation projections.

Preferably but not necessarily, each assembly member comprises: bolts and nuts that are coupled with bolt coupling holes of the adjacent supports.

Preferably but not necessarily, each cell formation body of each unit catalyst support block comprises:

central portions that are formed by winding wave plate/flat plate assemblies in a circle form in which the wave plate/flat plate assemblies are formed by assembling flat plates and wave plates that are formed by corrugating the flat plates, respectively; and a number of corner portions that are inserted between the outer circumferential surface of the outer-most central portion and each of the corner portions of the polygonal support.

Preferably but not necessarily, each corner portion is formed by shaping an annular winding body that is formed by winding one of the wave plate/flat plate assemblies.

Preferably but not necessarily, each cell formation body of each unit catalyst support block is formed by winding one of the wave plate/flat plate assemblies in a form of the polygonal support.

Preferably but not necessarily, each cell formation body of each unit catalyst support block is formed by stacking the wave plate/flat plate assemblies of a segment type corresponding to a length of one side of the polygonal support, and inserting the stacked wave plate/flat plate assemblies into the polygonal support.

Preferably but not necessarily, each cell formation body of each unit catalyst support block is formed by alternately stacking the wave plate/flat plate assemblies of a segment type to have a slope, and inserting the alternately stacked wave plate/flat plate assemblies into the polygonal support.

Preferably but not necessarily, both each cell formation body and the polygonal support is formed of any one of a hexagon, rectangle, triangle, and pentagon.

Preferably but not necessarily, each cell formation body of each unit catalyst support block is obtained by coating with one or more metals selected from the group consisting of platinum, cobalt, nickel, palladium, copper, manganese, and nano-silver as catalysts on a FeCrAl-based heat-resistant alloy thin plate.

Preferably but not necessarily, each of the hollow cells is formed of one selected from the group consisting of waveform, hemispherical form, honeycomb shapes, triangles, and rectangles.

According to another aspect of the present invention, there is also provided a catalytic converter comprising:

a large-capacity catalyst support comprising: a number of unit catalyst support blocks in which cell formation bodies formed of a number of hollow cells that are aligned in a longitudinal direction are accommodated and stacked in a polygonal supporter wherein a catalyst is coated on the surfaces of the hollow cells; and a number of assembly members each for fixing a pair of adjacent supports that mutually contact between the stacked unit catalyst support blocks, to thereby integrate the unit catalyst support blocks; and a heater.

Preferably but not necessarily, the large-capacity catalyst support is formed by disposing the heater between the supports of each unit catalyst support block and integrally assembling the heater with the supports.

Preferably but not necessarily, the heater is formed of a surface type heater whose front and rear surfaces are covered with an insulation material.

Preferably but not necessarily, the heater is placed at an air intake portion of the large-capacity catalyst support and preheated before exhaust gas enters from the air intake portion.

Advantageous Effects

As described above, the present invention can implement a catalytic converter by changing a number of unit catalyst support blocks in a form capable of being assembled and easily assembling the unit catalyst support blocks.

The present invention can produce and assemble a number of unit catalyst support blocks that are identical in shape and size, to thus simplify a manufacturing process and save a manufacturing cost without the need to enlarge a molding device and a thermal processing device of catalyst supports.

The present invention is applied to large vessels using large engines in correspondence to a marine engine exhaust nitrogen oxide regulation program of the International Prevention of Marine Pollution Convention (MARPOL) adopted by the International Maritime Organization (IMO), to thus provide exhaust gas purification facilities appropriate to the international standards.

DESCRIPTION OF DRAWINGS

The above and other objects and advantages of the present invention will become more apparent by describing the preferred embodiments thereof in detail with reference to the accompanying drawings in which.

BEST MODE

Figure 1:
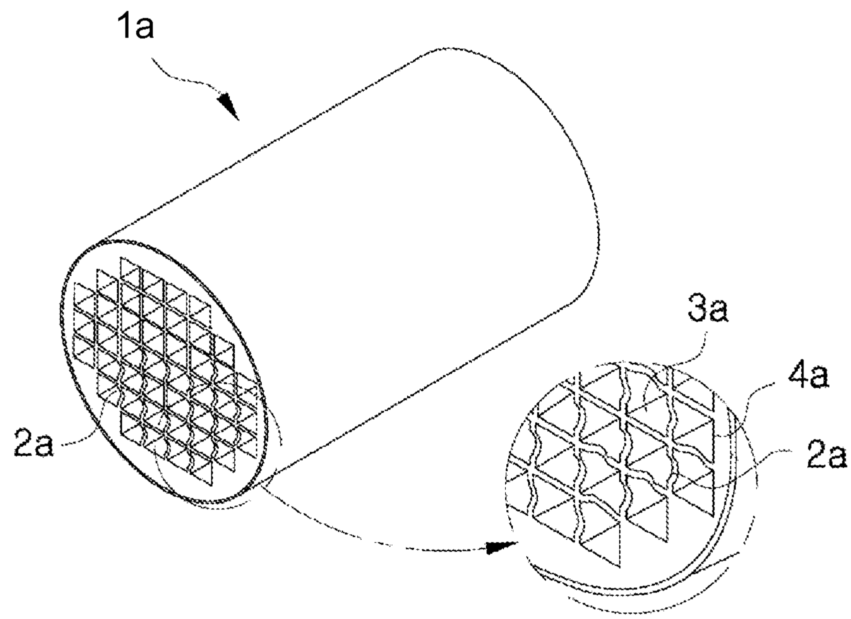
FIGS. 1 and 2 are perspective views showing conventional catalyst supports, respectively.
Figure 2:
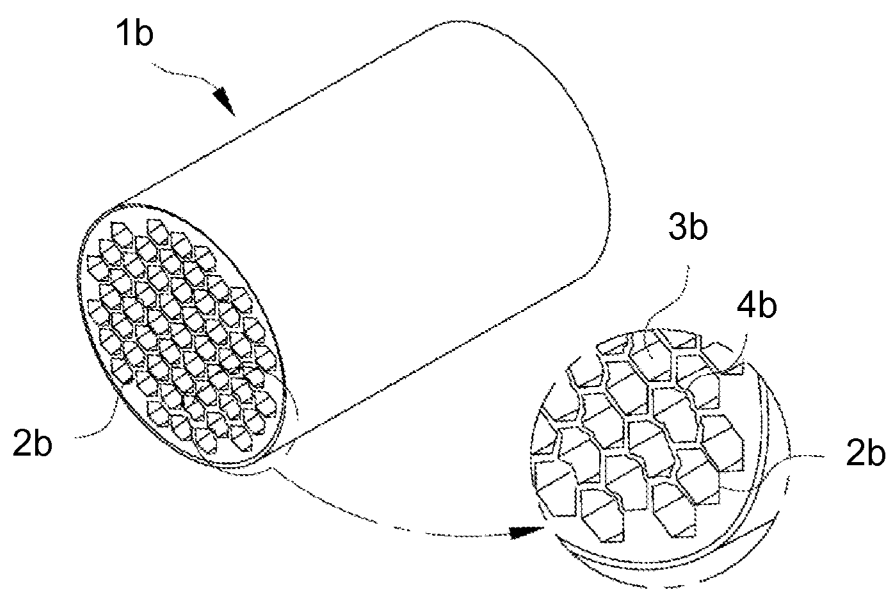

The above and other objects and advantages of the present invention will become more apparent by describing the preferred embodiments thereof in detail with reference to the accompanying drawings. Accordingly, one having an ordinary skill in the art will understand the technical spirit of the invention.

However, the detailed description of the relevant known functions or structures will be omitted in order to avoid any misunderstanding of the gist of the present invention, when operational principles of the preferred embodiments of the present invention are described.

Hereinbelow, a large-capacity catalyst support and a catalytic converter using the same according to various embodiments of the present invention will be described with reference to the accompanying drawings. Like reference numerals denote like elements through the following embodiments.

According to the present invention, a number of unit catalyst support blocks are changed in a form of being effectively assembled so as to be applied to a catalytic converter that is required for processing a large amount of exhaust gas such as large vessels or plants employing a number of large-scale internal combustion engines, or large food processing devices, to thus easily assemble the unit catalyst support blocks into a large-scale catalytic converter.

In particular, the unit catalyst support blocks are provided in the form of a various kinds of polygonal structures in order to improve easiness of an assembly. Here, a hexagonal structure which will be described as a first embodiment of the present invention and a rectangular structure which will be described as second through fifth embodiments of the present invention will be described as representative assembly structures.

First of all, the unit catalyst support blocks of the hexagonal structure according to the first embodiment of the present invention will be described.

Figure 3:
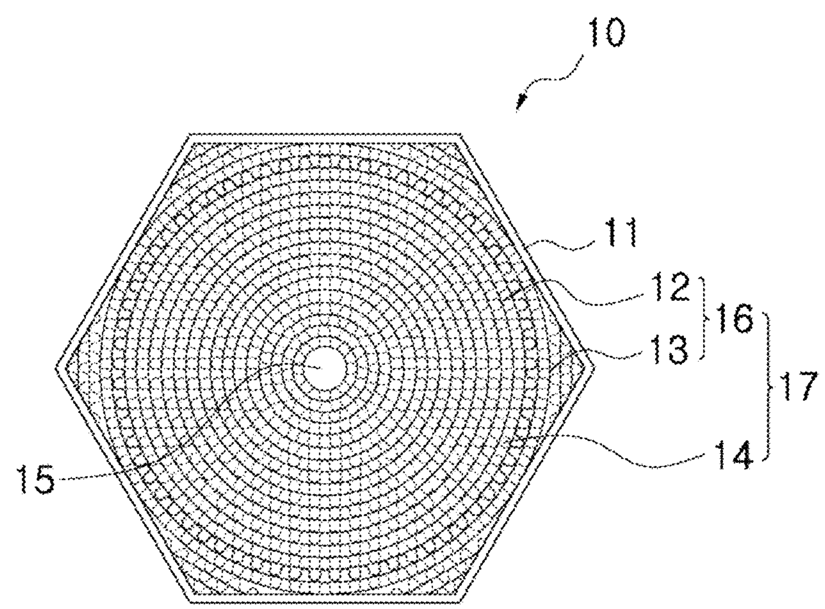
FIG. 3 is a front view showing a unit catalyst support block according to a first embodiment of the present invention.
Figure 4:
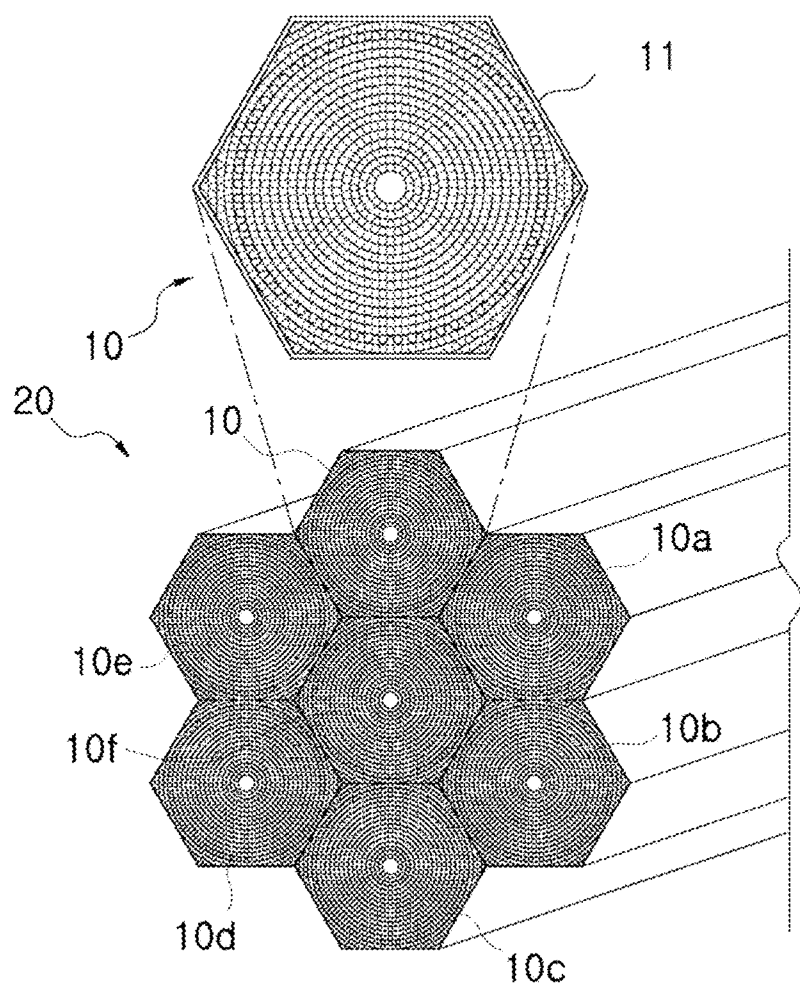
FIG. 4 is a perspective view showing a large-capacity catalyst support that is formed by assembling the unit catalyst support blocks of FIG. 3.

FIG. 3 is a front view showing a unit catalyst support block according to a first embodiment of the present invention, and FIG. 4 is a perspective view showing a large-capacity catalyst support that is formed by assembling the unit catalyst support blocks of FIG. 3.

A large-capacity catalyst support 20 according to the first embodiment of the present invention is formed to have a number of unit catalyst support blocks 10 to 10*f* that are stacked and assembled as shown in FIG. 4.

In the case that the unit catalyst support blocks 10 to 10*f* are stacked and assembled to form a stack assembly, it is desirable that the stack assembly has a structure that a space where catalyst supports are not filled between the blocks can be minimized, and a space where catalyst supports of each unit catalyst support block are not filled in a support 11 can be minimized, and has an easy manufacturing process.

The unit catalyst support blocks 10 to 10*f* that are used in the large-capacity catalyst support 20 will be described below. Here, only one unit catalyst support block 10 will be representatively described referring to FIG. 3.

Referring to FIG. 3, the unit catalyst support block 10 includes a support 11 and cell formation bodies 17. Each cell formation body 17 is formed by winding a wave plate/flat plate assembly 16 where wave plates 12 and flat plates 13 are adjacent to each other in the support 11, and forms a number of hollow cells 14. In this case, a catalytic layer is coated on the surfaces of the wave plates 12 and the flat plates 13, in order to purify an inflow exhaust gas or remove offensive odors.

The wave plates 12 and the flat plates 13 in the unit catalyst support block 10 are formed of a material that is formed by coating one or more metals selected from the group consisting of platinum, cobalt, nickel, palladium, copper, manganese, and nano-silver as catalysts on a heat-resistant alloy thin plate having a thickness of 20 to 100 μm. In this case, the wave plates 12 that are formed by corrugating the flat plates 13 and the flat plates 13 are assembled to form wave plate/flat plate assemblies 16, and then the wave plate/flat plate assemblies 16 are wound and inserted into the support 11. Here, the case that the wave plates 12 and the flat plates 13 are simultaneously applied has been described, but only a number of the wave plates 12 may be applied.

Meanwhile, according to user's demand, portions at which the wave plates 12 and the flat plates 13 contact are welded in order to avoid the wave plates 12 from being separated from the flat plates 13, to thus form the wave plate/flat plate assemblies 16, and then the wave plate/flat plate assemblies 16 are wound in a circle form to then be filled in the support 11. Then, corner portions may be separately fabricated and assembled in the inner side of the support 11, in order that corners of the support 11 may be filled with the corner portions. In addition, the corner portions may be formed by stacking a number of wave plate/flat plate assemblies 16 in the form of segments whose lengths differ from each other.

The cell formation bodies 17 that are filled in the inside of the support 11 may be fabricated into a first masking type in which the cell formation bodies 17 are formed in the inside of the support 11 as shown in FIG. 3. In addition, the cell formation bodies 17 that are filled in the inside of the support 11 may also be fabricated into a second masking type in which the cell formation bodies 17 are wound in a circle form according to a winding method to then be progressively formed in a hexagonal shape as it goes to the outermost portion of the support 11, or into a continuous winding type in which the cell formation bodies 17 are wound in a hexagonal shape. That is, the unit catalyst support blocks of a variety of shapes may be formed by a variety of methods.

However, it is desirable that the shape of the support 11 is polygonal in which the unit catalyst support block 10 may be assembled and stacked without forming empty spaces. For example, the shape of the support 11 may be hexagonal (see FIG. 3), rectangular (see FIG. 11), triangular, pentagonal, etc. Further, in the case that the unit catalyst support blocks are stacked over and assembled with each other, the shape of the support 11 such as a hexagon, a rectangle, or a triangle may cause empty spaces to be formed in which the catalyst supports are not filled in the inside of the supporter of each unit catalyst support block, but may allow an assembly process to be easy.

The cell formation bodies 17 of the unit catalyst support block 10 are provided to have a catalyst activation temperature that is set, for example, as 200 to 600° C. depending on a type of catalyst metal. In this case, the unit catalyst support block 10 is provided to have a number of hollow cells 14 that are formed in the longitudinal direction by the wave plates 12 and the flat plates 13. A penetration hole 15 through which an extension portion of, for example, a heater (not shown) is inserted may be formed or omitted at the center of the unit catalyst support block 10, as needed.

Each of the hollow cells 14 may be formed of one selected from the group consisting of waveform, hemispherical form, honeycomb shapes, triangles, and rectangles. A heat-resistant alloy thin plate forming the wave plates 12 and the flat plates 13 may be formed by using, for example, FeCrAl. It is desirable to use a Fecalloy alloy as a FeCrAl-based alloy material, in which the Fecalloy alloy is synthesized at a ratio of Fe-15Cr-5Al, or Fe-20Cr-5Al-REM (rare earth metal) where REM (Y, Hf, Zr) of about 1% is included.

A preferable example of assembling the plurality of the unit catalyst support blocks 10 to thus form a large-capacity catalyst support 20 is illustrated in FIG. 4.

Referring to FIG. 4, the large-capacity catalyst support 20 is formed by assembling a plurality of hexagonal unit catalyst support blocks 10 to 10*f* with each other. The respective unit catalyst support blocks 10 to 10*f* are stacked in a bundle form in which hexagonal planes of the hexagonal unit catalyst support blocks 10 to 10*f* are assembled in close contact with each other. Here, coupling of the unit catalyst support blocks 10 to 10*f* is realized by using first to fifth assembly members 60, 70, 80, 90, and 95 that are shown in FIGS. 5 to 10 to be described later. The large-capacity catalyst support 20 is manufactured by assembling a plurality of unit catalyst support blocks 10 to 10*f* that are formed of an identical size and shape. Accordingly, the large-capacity catalyst support 20 may be applied to a large-capacity converter of a large size, and if the number of the unit catalyst support blocks is adjusted according to a size or a processing capacity of a converter, the large-capacity catalyst support 20 may be manufactured in correspondence to a variety of sizes of converters having desired cross-sectional areas and surface areas.

The first to fifth assembly members for assembling the respective unit catalyst support blocks will be described in detail below with reference to FIGS. 5 to 10.

In the following description, only supports 11 and 11*a* of two unit catalyst support blocks are shown for convenience of explanation.

Figure 5:
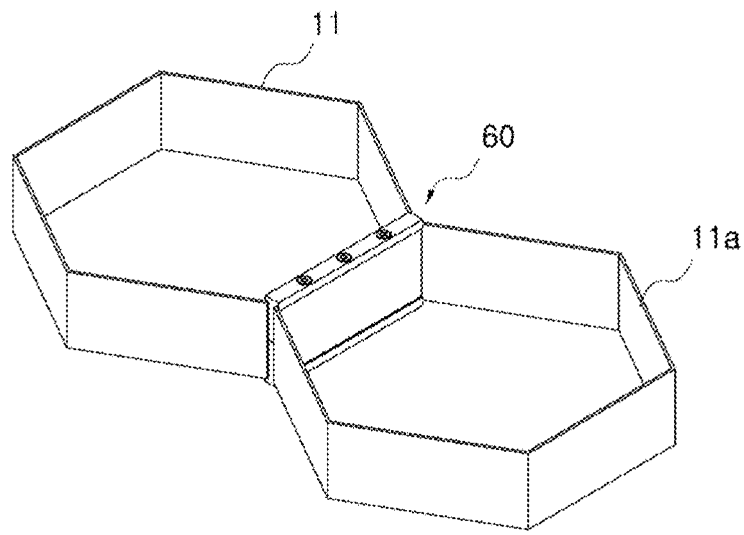
FIG. 5 is a perspective view showing that two unit catalyst support blocks are assembled by using a first assembly member according to the present invention.
Figure 6:
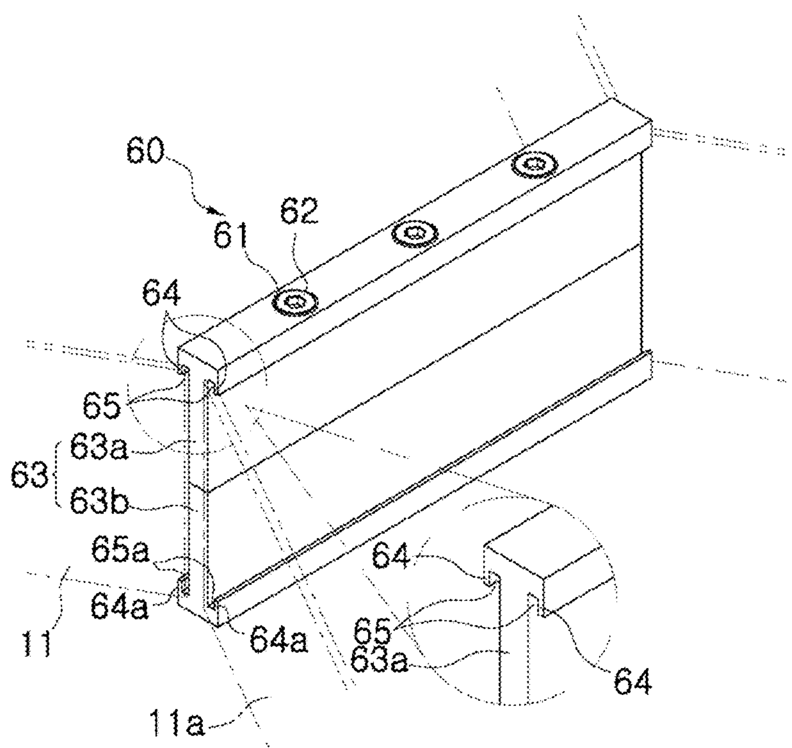
FIG. 6 is an enlarged perspective view showing the first assembly member shown in FIG. 5.

FIG. 5 is a perspective view showing that two unit catalyst support blocks are assembled by using a first assembly member according to the present invention, and FIG. 6 is an enlarged perspective view showing the first assembly member shown in FIG. 5.

Referring to FIGS. 3 to 6, a first assembly member 60 is disposed in a manner that two supports 11 and 11*a* of the respective unit catalyst support blocks 10 to 10*f* are assembled on opposing surfaces of the first assembly member 60.

The first assembly member 60 includes T-shaped upper and lower body pieces 63*a* and 63*b*. The T-shaped upper and lower body pieces 63*a* and 63*b* are screw-assembled by using assembly screws 62 through a number of assembly holes 61 that are formed in one surface of each of T-shaped upper and lower body pieces 63*a* and 63*b*, so that the T-shaped upper and lower body pieces 63*a* and 63*b* are in close contact with each other vertically, to thus form an I-shaped body 63. The I-shaped body 63 is formed to have support accommodation projections 64 and 64*a* that are extensively formed with a gap spaced away from the upper and lower body pieces 63*a* and 63*b*, in which support accommodation grooves 65 and 65*a* with which the supports 11 and 11*a* are fitted and coupled, are formed at both side surfaces of the respective upper and lower ends of the T-shaped upper and lower body pieces 63*a* and 63*b*.

First, the lower body piece 63*b* is fitted with the lower side of a side surface of each support 11 or 11*a*, and the upper body piece 63*a* is fitted with the upper side of the side surface of each support 11 or 11*a*. Then, the assembly screws 62 are coupled with the screw assembly holes 61, to thus tightly couple upper body and lower body pieces 63 and 63*a* with each other, and to thereby assemble two supports 11 and 11*a*.

In the same manner as described above, the first assembly members 60 are completely assembled with respect to the rest of the side surfaces of the supports 11 and 11*a* that are disposed at the respective outermost portions of the unit catalyst support blocks 10 to 10*f*, to thereby obtain a large-capacity catalyst support.

Figure 7:
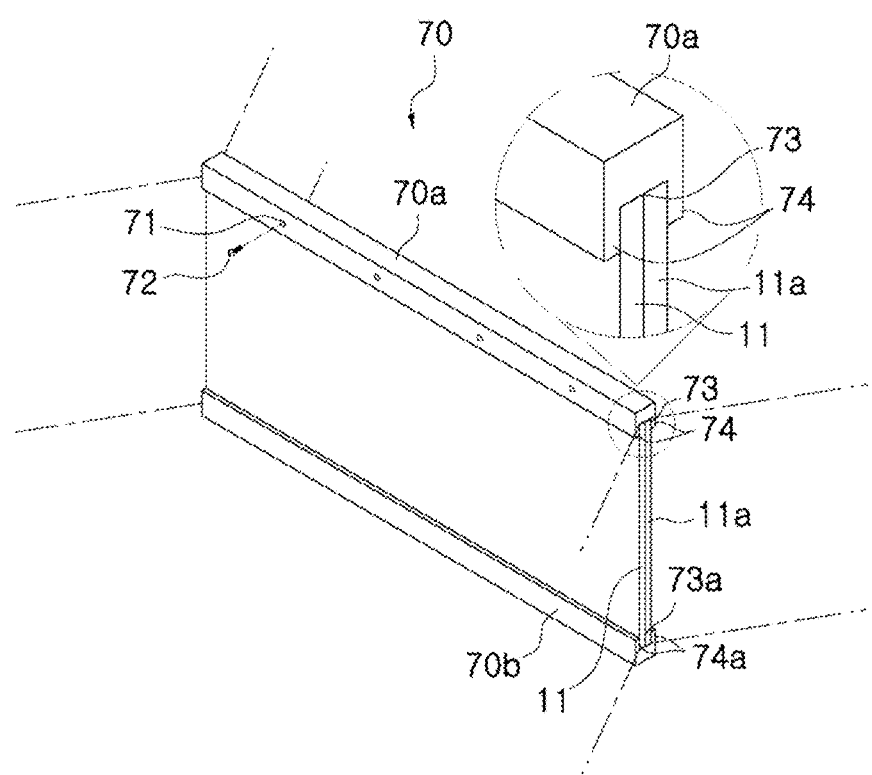
FIG. 7 is a perspective view of a second assembly member for assembling unit catalyst support blocks according to the present invention.

FIG. 7 is a perspective view of a second assembly member for assembling unit catalyst support blocks according to the present invention.

Referring to FIG. 7, the second assembly member 70 includes a pair of rod-shaped upper and lower body pieces 70*a* and 70*b* with which two adjacent supports 11 and 11*a* are fitted and coupled on top and bottom of the two adjacent supports 11 and 11*a*. Each body piece 70*a* or 70*b* is formed to have a number of pushing pin accommodation holes 71 at both side surfaces thereof, and is assembled with the supports 11 and 11*a* by pushing pins 72. The upper and lower body pieces 70*a* and 70*b* have trench-type support accommodation grooves 73 and 73*a* that are formed by support accommodation projections 74 and 74*a*, respectively.

First, two supports 11 and 11*a* are inserted into and then are fixed to the upper body piece 70*a* by the pushing pins 72 coupled into the pushing pin accommodation holes 71. The lower body piece 70*b* is also fixed by pushing pins coupled into pushing pin accommodation holes in the same manner as the upper body piece 70*a*.

Likewise, in the same manner as described above, the second assembly members 70 are completely assembled with respect to the rest of the side surfaces of the supports 11 and 11*a* that are disposed at the respective outermost portions of the unit catalyst support blocks 10 to 10*f*, to thereby obtain a large-capacity catalyst support.

Figure 8:
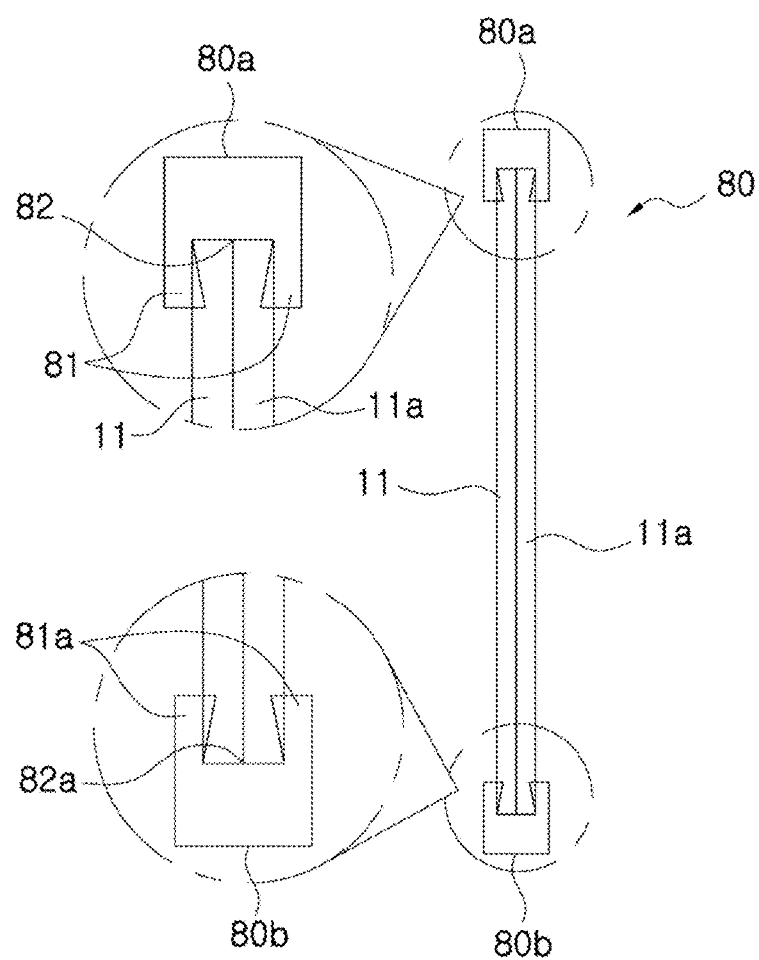
FIG. 8 is a perspective view of a third assembly member for assembling unit catalyst support blocks according to the present invention.

FIG. 8 is a perspective view of a third assembly member for assembling unit catalyst support blocks according to the present invention.

Referring to FIG. 8, the third assembly member 80 includes a pair of rod-shaped upper and lower body pieces 80*a* and 80*b* with which two adjacent supports 11 and 11*a* are fitted and coupled on top and bottom of the two adjacent supports 11 and 11*a*, similarly to the second assembly member 70. The inner surfaces of support accommodation projections 81 and 81*a* are lanced and are placed obliquely toward support accommodation grooves 82 and 82*a*. Thus, the supports 11 and 11*a* are inserted into and compressively combined with the support accommodation grooves 82 and 82*a*, to thereby combine the supports 11 and 11*a* with the support accommodation grooves 82 and 82*a* more firmly, even though an assembly work of screws 62 or a connection work of pushing pins 72 may be omitted.

Figure 9:
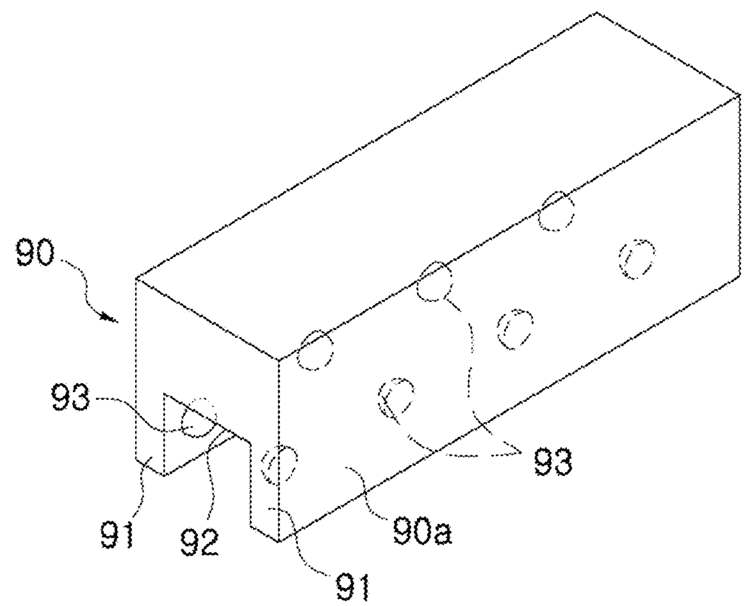
FIG. 9 is a perspective view of a fourth assembly member for assembling unit catalyst support blocks according to the present invention.

FIG. 9 is a perspective view of a fourth assembly member for assembling unit catalyst support blocks according to the present invention.

Referring to FIG. 9, the fourth assembly member 90 has a structure that a number of support fixing protrusions 93 are formed on both side surfaces of the support accommodation groove 92 of the second assembly member 70, and includes a rod-shaped body piece 90*a* in which a pair of support accommodation projections 91 accommodating supports 11 and 11*a* are formed at one side of the rod-shaped body piece 90*a*. As a result, a trench-type support accommodating groove 92 is formed between the pair of the support accommodation projections 91. Also, a number of the pairs of the support fixing protrusions 93 that face each other are formed in a lengthy direction along the inner surfaces of the support accommodation projections 91. Thus, when the supports 11 and 11*a* are inserted into the support accommodation groove 92, the supports 11 and 11*a* are compressively combined with the support accommodation groove 92 by the support fixing projections 93.

Figure 10:
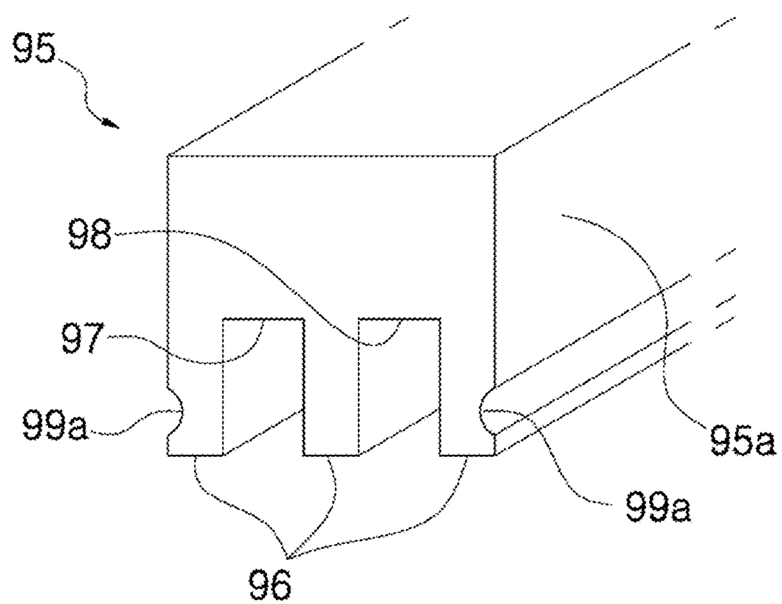
FIG. 10 is a perspective view of a fifth assembly member for assembling unit catalyst support blocks according to the present invention.

FIG. 10 is a perspective view of a fifth assembly member for assembling unit catalyst support blocks according to the present invention.

Referring to FIG. 10, the fifth assembly member 95 has a structure that three support accommodation projections 96 that are formed at intervals to accommodate supports 11 and 11*a* at one side of a rod-shaped body piece 95*a*, in which a pair of outer support accommodation projections are respectively extensively formed on both sides of the rod-shaped body piece 95*a*, and an intermediate support accommodation projection is extensively formed between the outer support accommodation projections so as to form first and second support accommodation grooves 97 and 98 in which the supports 11 and 11*a* are respectively accommodated. Here, compressing grooves 99*a* are concavely formed on the outer surfaces of the outer support accommodation projections instead of a number of support fixing projections 93 of the fourth assembly member 90. The compressing grooves 99*a* are respectively formed in a lengthy direction at the lower sides of both side surfaces of the outer support accommodation projections. Thus, the supports 11 and 11*a* are prevented from being separated from the first and second support accommodation grooves 97 and 98, by compressing the compressing grooves 99*a* after the supports 11 and 11*a* have been inserted into the first and second support accommodation grooves 97 and 98, respectively.

The fourth and fifth assembly members 90 and 95 are formed to have a pair of an upper body piece and a lower body piece that assemble and couple the upper and lower portions of the respective supports 11 and 11*a* with each other. However, only an upper body piece is shown and has been described in FIGS. 9 and 10.

As described above, the catalyst support according to the present invention, may be easily enlarged by assembling a number of unit catalyst support blocks by use of any one of the first to fifth assembly members 60, 70, 80, 90, and 95. Thus, in the case that the catalyst support according to the present invention is used to remove offensive odors in a large-scale food processing unit, the catalyst support may be combined with a heater to thereby form a large-capacity catalytic converter. Otherwise, the catalyst support may be used to purify an exhaust gas in a large vessel or plant facility, alone or in combination with a heater.

On the following, the second to fifth embodiments of the present invention, will be described.

Figure 11:
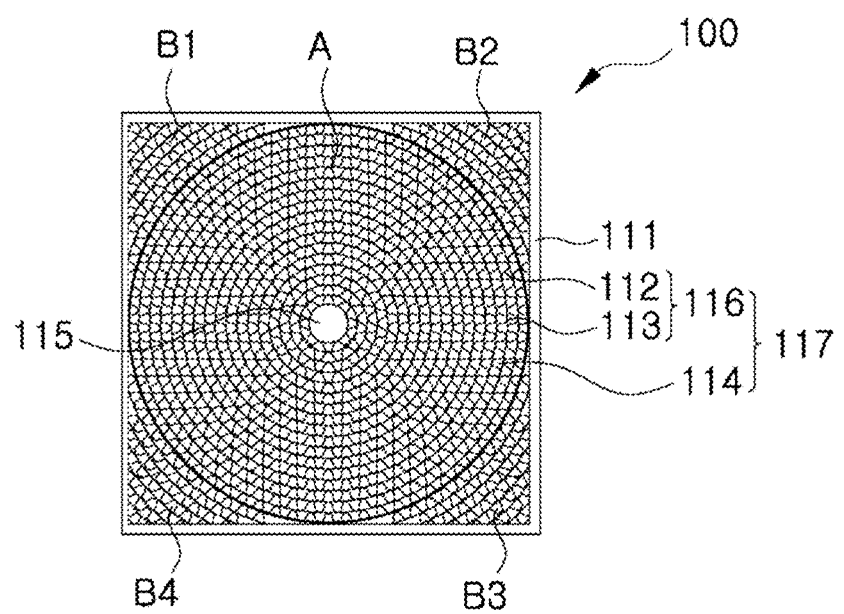
FIG. 11 is a front view showing a unit catalyst support block according to a second embodiment of the present invention.
Figure 12:
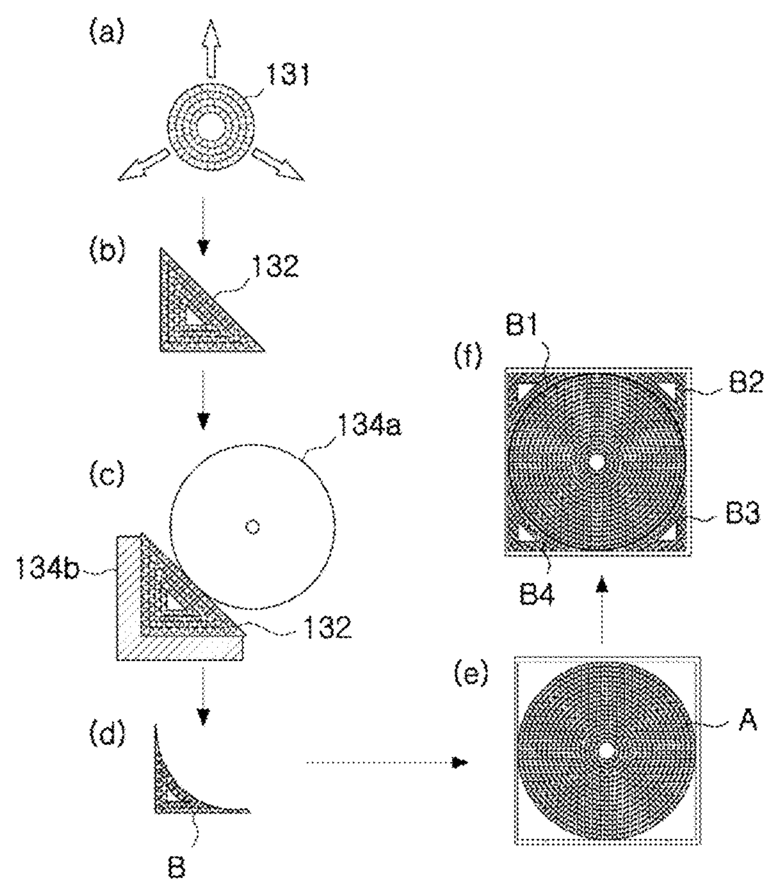
FIG. 12 is a flowchart view describing a process of manufacturing a unit catalyst support block of FIG. 11.
Figure 13:
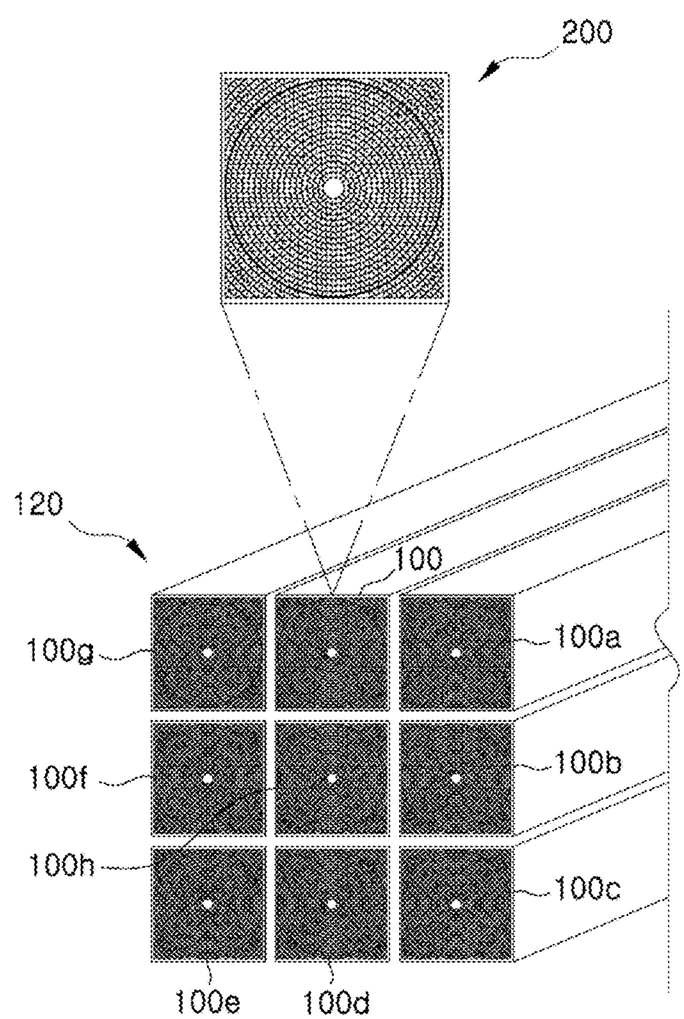
FIG. 13 is a perspective view of a large-capacity catalyst support that is formed by assembling the unit catalyst support blocks of FIG. 3.

FIG. 11 is a front view showing a unit catalyst support block according to a second embodiment of the present invention, FIG. 12 is a flowchart view describing a process of manufacturing a unit catalyst support block of FIG. 11, and FIG. 13 is a perspective view of a large-capacity catalyst support that is formed by assembling the unit catalyst support blocks of FIG. 3.

The unit catalyst support block 100 has a rectangular structure as a whole, and includes a number of cell formation bodies 117. Each of the cell formation bodies 117 is formed by a wave plate 112 and a flat plate 113, and includes a plurality of hollow cells 114 that are formed in a wave or semicircular shape. Since the cell formation bodies 117 are formed similarly to those of FIG. 3, the description thereof will be omitted.

As shown in FIG. 13, the large-capacity catalyst support 120 according to the second embodiment of the present invention is formed to have a number of rectangular unit catalyst support blocks 100 to 100*h* that are stacked over and assembled with one another. Here, the unit catalyst support blocks 100 to 100*h* that are used for the large-capacity catalyst support 120 will be described below. However, only the unit catalyst support block 100 will be described below with reference to FIG. 11, as a representative example.

Referring to FIG. 11, the unit catalyst support block 100 includes a rectangular supporter 111 and rectangular cell formation bodies 117. Each cell formation body 117 is formed by winding a wave plate/flat plate assembly 116 where wave plates 112 and flat plates 113 are adjacent to each other in the support 111, and forms a number of hollow cells 114.

In this case, a catalytic layer is coated on the surfaces of the wave plates 112 and the flat plates 113, in order to purify an inflow exhaust gas or remove offensive odors. Here, the cell formation bodies 117 of the unit catalyst support block 100 include: central portions A that are formed by winding wave plate/flat plate assemblies 116 in a circle form in which the wave plate/flat plate assemblies 116 are formed by assembling flat plates 113 and wave plates 112 that are formed by corrugating the flat plates 113, respectively, and that are tangential to four sides of the supporter 111 in a spiral form in the supporter 111; and a number of corner portions B1 to B4 that are alternately inserted between the outer circumferential surface of the outer-most central portion and each of the corner portions of the supporter 111, that is, the four corners of the supporter 111, in which partial wave plate/flat plate assemblies that are formed by assembling the partial flat plate with the partial wave plates that are formed by corrugating the partial flat plates 113.

The central portions A may be formed by winding wave plate/flat plate assemblies 116 in a circle form as shown in FIG. 11. Otherwise, the central portions may be formed by winding wave plate/flat plate assemblies in a polygon form at first and by winding wave plate/flat plate assemblies in a circle form as it goes to the outer side of the supporter 111. Here, the central portions A are welded at portions where the wave plates 112 and the flat plates 113 contact each other in order to prevent the wave plates 112 from being separated from the flat plates 113. Accordingly, the wave plate/flat plate assemblies 116 may be wound in a circle form. In addition, the corner portions B1 to B4 are formed by inserting a number of the partial wave plate/flat plate assemblies that are formed by assembling the partial flat plate with the partial wave plates in the form of segments of different lengths into corners of the rectangular supporter 111, respectively.

The wave plate/flat plate assemblies 116 forming the cell formation bodies 117 are formed by using the same material and cell shape as those of the first embodiment of the present invention.

The unit catalyst support block 100 is set to, for example, 200 to 600° C. depending on type of a catalyst metal, as a catalyst activation temperature. In this case, the unit catalyst support block 100 includes a plurality of hollow cells 114 that are formed in the longitudinal direction by the wave plates 112 and the flat plates 113. In addition, a penetration hole 115 through which an extension portion of, for example, a heater (not shown) is inserted may be formed or omitted at the central portion of the unit catalyst support block 100. Here, the heater is needed in order to form an activation temperature environment of a catalyst metal in the case that temperature of the exhaust gas is low at the time of an initial operation. Accordingly, the case that the unit catalyst support block 100 is applied for a large-capacity catalytic converter with a heater will be described later with reference to FIGS. 18 and 19.

Meanwhile, the corner portions B1 to B4 may be formed of corner-shaped portions that may be fabricated through a particularly designed process of FIG. 12 and may be inserted into four corners of the supporter 111, instead of inserting the partial wave plate/flat plate assemblies that are formed in a segment shape into the four corners of the supporter 111.

Referring to FIG. 12, in steps (a) and (b), an annular wound body 131 that are formed by winding the wave plate/flat plate assemblies 116 is pulled by three-direction pulling forces in order to transform the annular wound body 131 into a triangle module 132 having a shape that is similar to that of each corner of the supporter 111. Here, it is desirable to form the triangle module 132 in a right-angled triangle so as to be easily inserted into each corner of the supporter 111. Since then, in steps (c) and (d), the triangle module 132 is disposed between jigs 134*a* and 134*b*, to thus transform an oblique side facing the right angle of the triangle module 132 according to a curvature of the central portions A, and to thereby form a corner portion B. Here, for convenience of explanation, the corner portions B1 to B4 are referred to as the corner portion B collectively. Meanwhile, in step (e), the central portion A is formed and then inserted into the supporter 111. In step (f), the corner portions B1 to B4 are inserted into the four corners of the supporter 111, respectively, to thereby form a rectangular unit catalyst support block 100.

Figure 17:
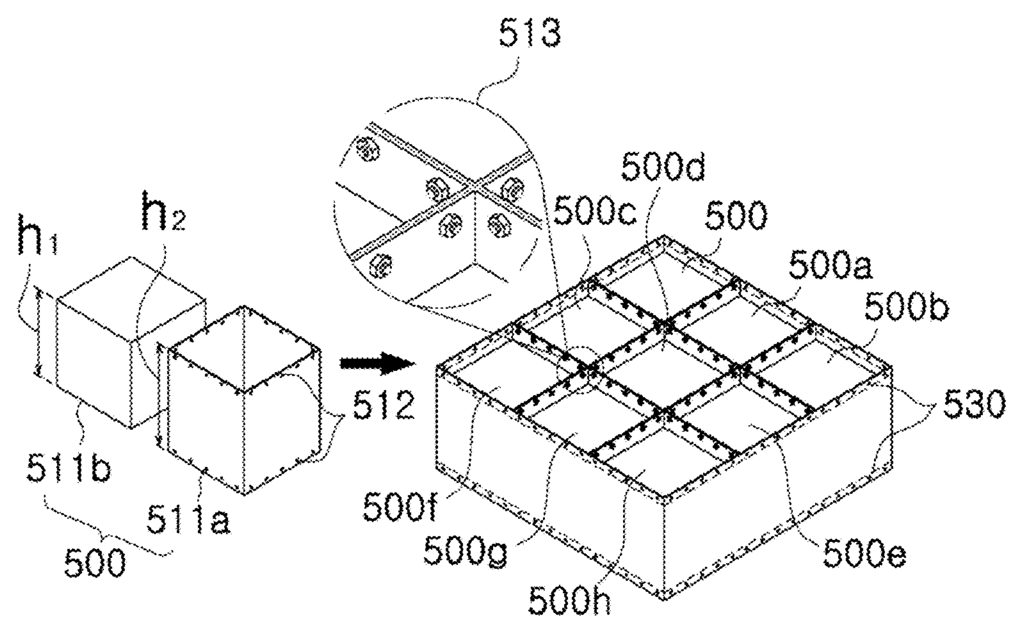
FIG. 17 is a perspective view of a large-capacity catalyst support that is assembled by using the unit catalyst support blocks according to the second to fifth embodiments of the present invention.

A preferred example of assembling the unit catalyst support blocks 100 to form a large-capacity catalyst support 120 is illustrated in FIG. 13. Referring to FIG. 13, the large-capacity catalyst support 120 is formed by assembling a number of the unit catalyst support blocks 100 to 100*h*. The respective unit catalyst support blocks 100 to 100*h* are stacked over one another so that the rectangular surfaces are assembled in close contact with one another. Here, the respective unit catalyst support blocks 100 to 100*h* are assembled as shown in FIG. 17 to be described later. The detailed description thereof will be described later with reference to FIG. 17. Further, the respective unit catalyst support blocks 100 to 100*h* may be assembled by using any one of the first to fifth assembly members 60, 70, 80, 90, and 95 that have been described with reference to FIGS. 6 to 10. Since assembling of the unit catalyst support blocks 100 to 100*h* may be easily understood by one skilled in the art, the detailed description thereof will be omitted.

Figure 14:
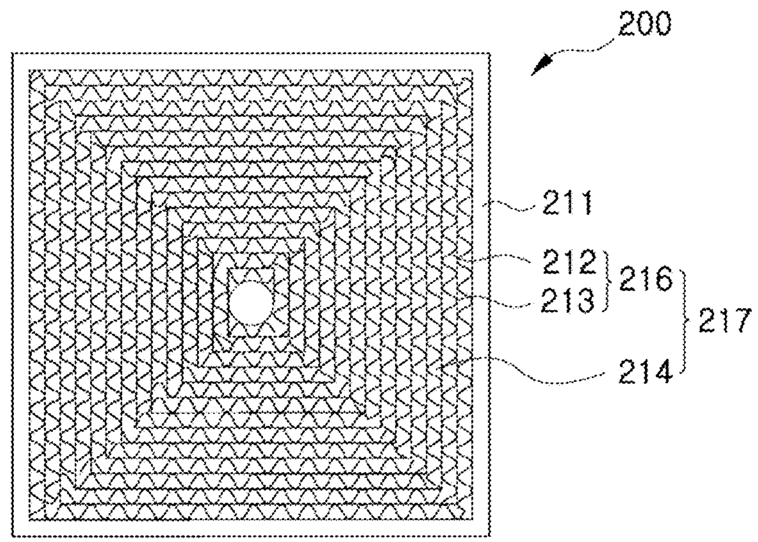
FIG. 14 is a front view showing a unit catalyst support block according to a third embodiment of the present invention.
Figure 15:
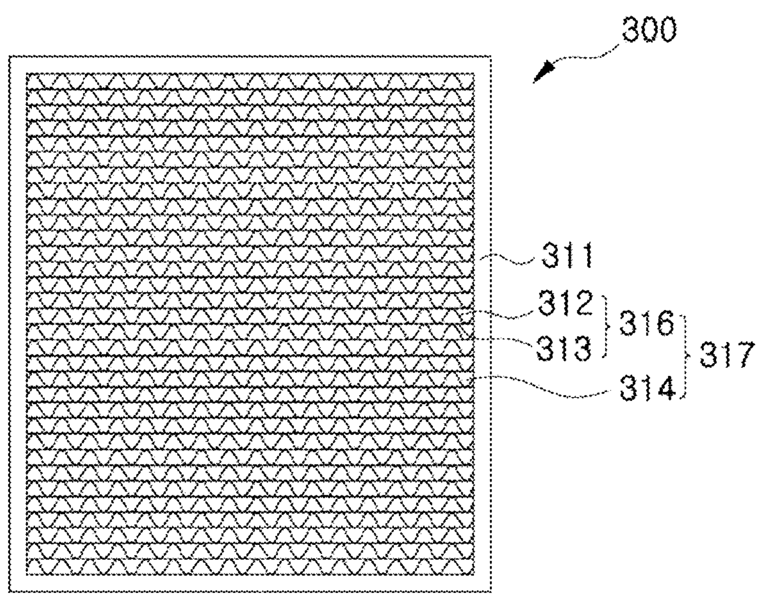
FIG. 15 is a front view showing a unit catalyst support block according to a fourth embodiment of the present invention.
Figure 16:
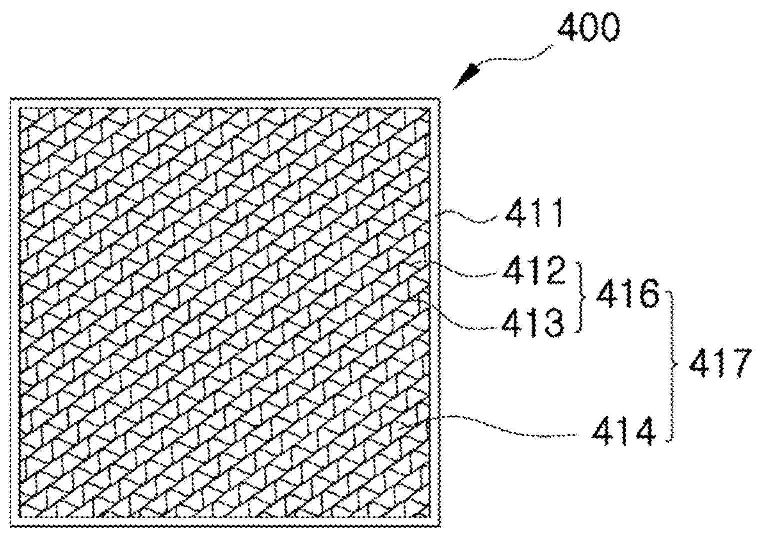
FIG. 16 is a front view showing a unit catalyst support block according to a fifth embodiment of the present invention.

FIG. 14 is a front view showing a unit catalyst support block according to a third embodiment of the present invention, FIG. 15 is a front view showing a unit catalyst support block according to a fourth embodiment of the present invention, and FIG. 16 is a front view showing a unit catalyst support block according to a fifth embodiment of the present invention.

As shown in FIGS. 14 to 16, respective cell formation bodies 217, 317, and 417 of respective unit catalyst support blocks 200, 300, and 400 according to third to fifth embodiments of the present invention are formed by inserting wave plate/flat plate assemblies 216, 316, and 416 into respective rectangular supporters 211, 311, and 411, in a variety of processes. In this case, a number of hollow cells 214, 314, and 414 are formed when wave plates 212, 312, and 412 contact flat plates 213, 313, and 413.

In more detail, the cell formation bodies 217 of the unit catalyst support block 200 according to the third embodiment that are formed by bending the wave plate/flat plate assemblies 216 at a right angle to then be wound in a spiral form, are inserted into the rectangular supporter 211 (see FIG. 14). Also, the cell formation bodies 317 of the unit catalyst support block 300 according to the fourth embodiment that are formed by sequentially stacking the wave plate/flat plate assemblies 316 each corresponding to one side of the rectangular supporter 311, are inserted into the rectangular supporter 311 (see FIG. 15). In addition, the cell formation bodies 417 of the unit catalyst support block 400 according to the fifth embodiment that are formed by sequentially stacking the wave plate/flat plate assemblies 416 so as to have a certain slope, are inserted into the rectangular supporter 411.

The respective unit catalyst support blocks 200, 300, and 400 according to third to fifth embodiments of the present invention are assembled with one another to thus form a large-capacity catalyst support, in the same manner as that of the unit catalyst support blocks 100 according to the second embodiment shown in FIG. 13. Since the unit catalyst support blocks 200 to 400 may be assembled according to a method illustrated in FIG. 17 to be described later, the detailed description thereof will be described below with reference to FIG. 17, in the same manner as assembling of the unit catalyst support blocks 100 to 100*h* according to the second embodiment of the present invention.

FIG. 17 is a perspective view of a large-capacity catalyst support that is assembled by using the unit catalyst support blocks according to the second to fifth embodiments of the present invention. Here, for convenience of explanation, the unit catalyst support blocks 100 to 400 according to the second to fifth embodiments of the present invention are referred to as a unit catalyst support block 500 collectively, the supporters 111 to 411 of the unit catalyst support blocks 100 to 400 according to the second to fifth embodiments of the present invention are referred to as a supporter 511*a* collectively, and the cell formation bodies 117, 217, 317, and 417 that are inserted into the supporters 111 to 411 of the unit catalyst support blocks 100, 200, 300, and 400 according to the second to fifth embodiments of the present invention are referred to as a cell formation body 511*b* collectively.

The supporter 511*a* is configured to have a rectangular shape in which the top and bottom portions of the supporter 511*a* are open. A plurality of bolt assembly holes 512 are formed on the upper and lower edges of each surface of the supporter 511*a*. In this case, a height h2 of the supporter 511*a* is higher than a height h1 of the cell formation body 511*b*. Thus, although the supporter 511*a* accommodates the cell formation body 511*b*, it is possible to assemble adjacent supporters by a bolt assembly process 513 through bolt assembly holes 512. As an example, the supporter 511*a* has a dimension of 324 mm wide×324 mm long×380 mm high (h2) and the cell formation body 511*b* has a dimension of 320 mm wide×320 mm long×280 mm high (h1).

Meanwhile, a large-capacity catalyst support 520 is formed by assembling a number of unit catalyst support blocks 500 to 500*h* with one another in which the respective rectangular surfaces of the unit catalyst support blocks 500 to 500*h* are in close contact with one another to then be coupled with one another by a bolt connection through the bolt assembly holes 512. In addition, the large-capacity catalyst support 520 is sealed with a case 530 along the outermost edges of the upper and lower portions thereof, to thus heighten durability and capability of assembly.

Since the large-capacity catalyst support 520 is formed by assembling a number of unit catalyst support blocks 500 to 500*h* with one another in which the respective rectangular surfaces of the unit catalyst support blocks 500 to 500*h* are in close contact with one another to then be coupled with one another by a bolt connection through the bolt assembly holes 512, it is possible to set a fill factor of the cell formation body 511*b* at maximum and to minimize the overall deformation of the cell formation body 511*b*. In addition, since a load of the large-capacity catalyst support 520 is distributed downward through the respective rectangular surfaces of the unit catalyst support blocks 500 to 500*h*, the large-capacity catalyst support 520 is stably maintained in shape. In addition, when the large-capacity catalyst support 520 is mounted, the unit catalyst support blocks 500 to 500*h* may be distributed optimally due to a rectangular formalized shape.

Meanwhile, a bolt assembly structure of the supporters 111 to 411 with respect to the unit catalyst support blocks 500 to 500*h* according to the second to fifth embodiments shown in FIG. 17, may be applied for an assembly of the supporters 11 and 11*a* according to the first embodiment of the present invention.

In addition, on the contrary, the first to fifth assembly members 60, 70, 80, 90, and 95 according to the first embodiment of the present invention may be also applied to the supporters 111 to 411 with respect to the unit catalyst support blocks 500 to 500*h* according to the second to fifth embodiments of the present invention.

Figure 18:
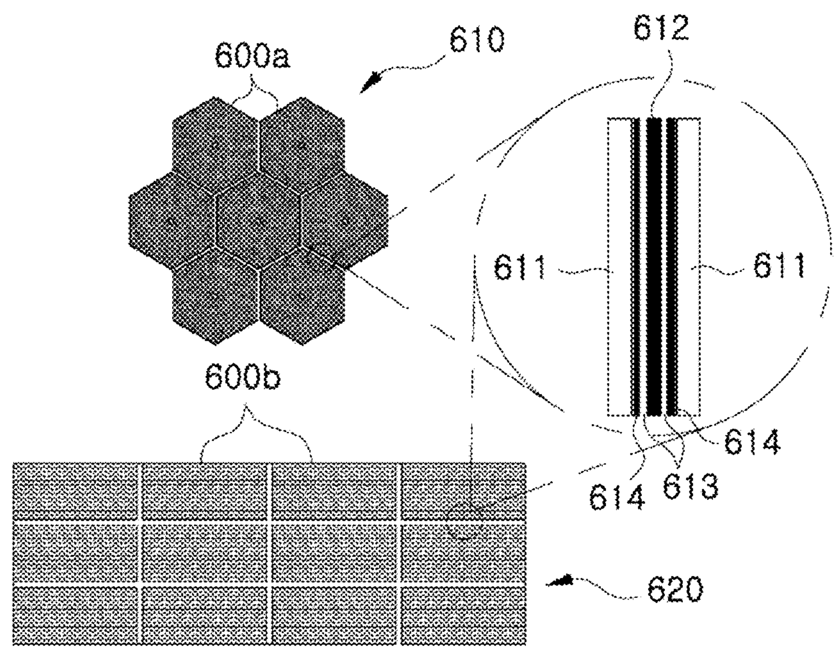
FIG. 18 is a front view showing a catalytic converter according to another aspect of the present invention.

FIG. 18 is a front view showing a catalytic converter according to another aspect of the present invention.

The unit catalyst support block 10 according to the first embodiment of the present invention corresponds to the unit catalyst support blocks 600*a* of FIG. 18, and the unit catalyst support blocks 100 to 400 according to the second to fifth embodiments of the present invention correspond to the unit catalyst support blocks 600*b* of FIG. 18. The unit catalyst support blocks 600*b* of FIG. 18 have indicated the unit catalyst support blocks 300 according to the fourth embodiment of the present invention, but are not limited thereto which will be easily understood by one having an ordinary skill in the art.

As described above, the unit catalyst support blocks 600*a* and 600*b* are combined with a heater 612 to thus constitute a catalytic converter at the time of forming large-capacity catalyst supports 610 and 620.

The catalytic converter according to the present invention of FIG. 18 is formed by placing the heater 612 on the supporter 611 of the respective unit catalyst support blocks 600*a* and 600*b* when the large-capacity catalyst supports are formed. That is, the catalytic converter according to the present invention forms an elected heated catalytic converter (EHC) in which the supporter 611 is integrated with the heater 612. The heater 612 is a filament or surface type heater. The front and rear surfaces of the heater 612 are covered with and protected by insulators 613. Upper and lower covers 614 may be selectively applied on the front and rear surfaces of the insulators 613, respectively.

Figure 19:
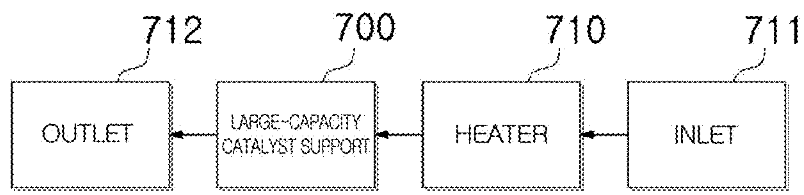
FIG. 19 is a block diagram showing a catalytic converter according to another aspect of the present invention.

FIG. 19 is a block diagram showing a catalytic converter according to another aspect of the present invention.

As described above, the unit catalyst support blocks 10, 100, 200, 300, and 400 according to the first to fifth embodiments of the present invention are assembled with one another, to thus constitute a large-capacity catalyst support 700 of FIG. 19. Here, the large-capacity catalyst support 700 of FIG. 19 is connected with a heater 710 that is disposed with a gap from an inlet 711. Accordingly, an exhaust gas that is fed out through the inlet 711 is heated via the heater 711, and then purified through the large-capacity catalyst support 700 to then be discharged via an outlet 712.

As shown in FIGS. 18 and 19, the heaters 612 and 710 are selectively disposed with respect to the catalytic converters, respectively. Thus, in the case that temperature of the exhaust gas is lower than the catalyst activation temperature, the large-capacity catalyst supports 610, 620 and 700 are preheated in advance, for an initial reaction that needs an additional heat source at the reaction in the large-capacity catalyst supports 610, 620 and 700, to thereby form a reaction environment of the large-capacity catalyst supports 610, 620 and 700, respectively.

MODE FOR INVENTION

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

This invention may be applied to catalyst supports for large-capacity catalytic converters that are used in large vessels or plants or large-capacity food processing units.

The invention claimed is:

1. A large-capacity catalyst support comprising:

a plurality of unit catalyst support blocks being stacked, wherein each of the unit catalyst blocks comprises: a support having a polygonal cross-section and a length; a cell formation body contained inside the support, and the cell formation body includes a plurality of hollow cells being aligned in a longitudinal direction of the support; and a catalyst is coated on surfaces of the hollow cells, wherein the cell formation body comprises a central portion formed of a wound assembly of wave plate/flat plate and having a circular cross-section, and a corner portion inserted into corners of the polygonal cross-section in the support, the wound assembly of the wave plate/flat plate forming the plurality of the hollow cells; and a plurality of assembly members each fixing a pair of adjacent supports that mutually contact between the stacked unit catalyst support blocks.

2. The large-capacity catalyst support according to claim 1, wherein each assembly member comprises:

an upper body piece that is made in a T-shaped form and at both sides of one of which a pair of first support accommodation projections are extensively formed so as to form a pair of first support accommodation grooves;

a lower body piece that is made in a T-shaped form and at both sides of one end of which a pair of second support accommodation projections are extensively formed so as to form a pair of second support accommodation grooves; and a fixing unit for fixing the upper and lower body pieces.

3. The large-capacity catalyst support according to claim 1, wherein each assembly member comprises:

an upper body piece at both sides of one end of which a pair of first support accommodation projections are respectively extensively formed so as to form a first support accommodation groove in which one side of the one support is accommodated;

a lower body piece at both sides of one end of which a pair of second support accommodation projections are respectively extensively formed so as to form a second support accommodation groove in which one side of the other support is accommodated; and a number of pushing pins that are coupled with a number of pushing pin accommodation grooves that are formed along a width direction of each body piece so as to fix the supports.

4. The large-capacity catalyst support according to claim 1, wherein each assembly member comprises:

an upper body piece at both sides of one end of which a pair of first support accommodation projections whose inner surfaces are lanced and that are placed obliquely toward a first support accommodation groove, are respectively extensively formed so as to form the first support accommodation groove in which one side of the one support is accommodated; and a lower body piece at both sides of one end of which a pair of second support accommodation projections whose inner surfaces are lanced and that are placed obliquely toward a second support accommodation groove, are respectively extensively formed so as to form the second support accommodation groove in which one side of the other support is accommodated.

5. The large-capacity catalyst support according to claim 1, wherein each assembly member comprises:

an upper body piece at both sides of one end of which a pair of first support accommodation projections are respectively extensively formed so as to form a first support accommodation groove in which one side of the one support is accommodated, wherein the upper body piece has a number of pairs of first support fixing projections that are protrudingly formed on the inner surfaces of the first support accommodation projections and that are compressively coupled with the one support; and a lower body piece at both sides of one end of which a pair of second support accommodation projections are respectively extensively formed so as to form a second support accommodation groove in which one side of the other support is accommodated, wherein the lower body piece has a number of pairs of second support fixing projections that are protrudingly formed on the inner surfaces of the second support accommodation projections and that are compressively coupled with the other support.

6. The large-capacity catalyst support according to claim 1, wherein each assembly member comprises:

an upper body piece at both sides of one end of which a pair of first support accommodation projections are respectively extensively formed wherein a first intermediate support accommodation projection is extensively formed between the first support accommodation projections so as to form first and second support accommodation grooves in which the supports are respectively accommodated, wherein the upper body piece has first compressing grooves that are concavely formed on the outer surfaces of the first support accommodation projections; and a lower body piece at both sides of one end of which a pair of second support accommodation projections are respectively extensively formed wherein a second intermediate support accommodation projection is extensively formed between the second support accommodation projections so as to form third and fourth support accommodation grooves in which the supports are respectively accommodated, wherein the lower body piece has second compressing grooves that are concavely formed on the outer surfaces of the second support accommodation projections.

7. The large-capacity catalyst support according to claim 1, wherein each assembly member comprises: bolts and nuts that are coupled with bolt coupling holes of the adjacent supports.

8. The large-capacity catalyst support according to claim 1, wherein the corner portion is formed by shaping an annular winding body that is formed by winding a wave plate/flat plate assembly.

9. The large-capacity catalyst support according to claim 1, wherein each cell formation body of each unit catalyst support block is formed by stacking the wave plate/flat plate assemblies of a segment type corresponding to a length of one side of the polygonal support, and inserting the stacked wave plate/flat plate assemblies into the polygonal support.

10. The large-capacity catalyst support according to claim 1, wherein each cell formation body of each unit catalyst support block is formed by alternately stacking the wave plate/flat plate assemblies of a segment type to have a slope, and inserting the alternately stacked wave plate/flat plate assemblies into the polygonal support.

11. The large-capacity catalyst support according to claim 1, wherein the polygonal cross-section of the support is formed of any one of a hexagon, rectangle, triangle, and pentagon.

12. The large-capacity catalyst support according to claim 1, wherein the catalyst includes one or more metals selected from the group consisting of platinum, cobalt, nickel, palladium, copper, manganese, and nano-silver, and the wound assembly of the wave plate/flat plate is formed of a FeCrAl-based heat-resistant alloy thin plate.

13. The large-capacity catalyst support according to claim 1, wherein the hollow cells are formed of one selected from the group consisting of waveform, hemispherical form, honeycomb shapes, triangles, and rectangles.

* * * * *